Dec. 6, 1938.   R. S. VINCENT   2,139,051
MANUFACTURE OF ELECTRIC CABLES
Filed Nov. 28, 1936
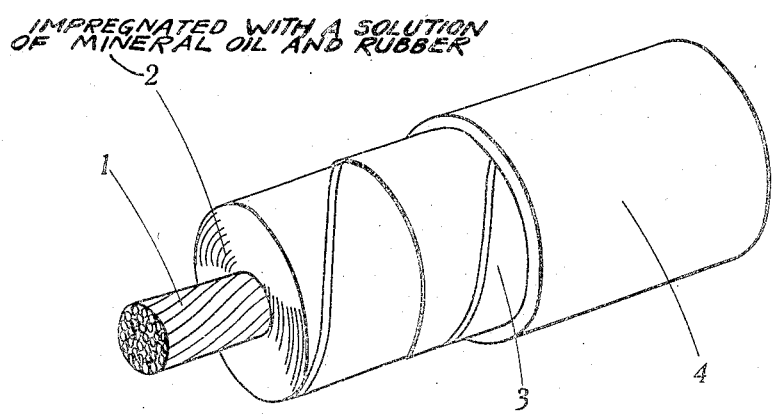
INVENTOR
RUSSELL SWALE VINCENT
By
his ATTORNEYS Patented Dec. 6, 1938

2,139,051

UNITED STATES PATENT OFFICE 2,139,051

MANUFACTURE OF ELECTRIC CABLES

Russell Swale Vincent, London, England, assignor to Callender's Cable and Construction Company, Limited, London, England, a British company Application November 28, 1936, Serial No. 113,162
In Great Britain December 11, 1935

2 Claims. (Cl. 106—13)

In the manufacture of electric cables having an impregnated dielectric (usually paper) it is the present general practice to use as an impregnating material a mineral oil or a compound of rosin in mineral oil. An important object of the addition of rosin is the giving of viscosity to the impregnating material so as to reduce its freedom of migration within the dielectric. It has previously been proposed to impregnate the fibrous insulation of electric cables with a material comprising a solution of rubber in mineral oil. The present invention is concerned with the production of an improved impregnating material of this type that is suitable for use with so called supertension cables, that is, cables designed to operate at pressures of at least 20,000 volts. In accordance with the present invention, the improved impregnating material comprises a colloidal solution of pure rubber in mineral oil which is formed by incorporating the rubber with the oil under conditions which exclude air and atmospheric impurities, subjecting the mass to a filtration process to remove traces of impurities which do not readily dissolve, and afterwards exposing it to a high vacuum at an elevated temperature, to ensure removal of volatile impurities. Preferably, the exclusion of air and atmospheric impurities is ensured by making the solution under vacuum. Solutions containing up to 2% by weight of rubber have been found to be satisfactory and produce compounds within the range of viscosity at present usual with cable impregnating compound.

It may be advantageous to effect the mixing of rubber and oil by first using a liquid of a high solvent capacity for rubber, such as benzol or trichlorethylene, for the purpose of making a solution of rubber, which is then mixed with the mineral oil and from this mixture the solvent is evaporated. It is believed that by this method the rubber in the colloidal solution with the oil is in smaller molecular aggregates than is the case if the mixture is made directly and this difference appears to give advantageous results in the compound.

The accompanying drawing shows in perspective an example of a cable constructed in accordance with the invention. The cable comprises a stranded conductor 1 surrounded by a dielectric 2 consisting of a laminated body of paper impregnated with an insulating fluid consisting of a colloidal solution of pure rubber in mineral oil. This dielectric is surrounded by a covering 3 of metallized paper and the whole is enclosed within a lead sheath 4.

Impregnation can be carried out by the usual methods including evacuation, drying and pressure impregnation at a raised temperature.

Cables impregnated in accordance with the invention are found to have superior electric properties particularly when used for high working voltages.

What I claim as my invention is—

1. The method of producing a cable impregnating compound which comprises making, under conditions that exclude air and atmospheric impurities, a colloidal solution of pure rubber in mineral oil, filtering the said solution to remove undissolved matter, and exposing it to a high vacuum at an elevated temperature to remove volatile impurities.

2. A method of producing a cable impregnating compound which comprises making under conditions that exclude air and atmospheric impurities, a solution of pure rubber in a volatile liquid having a high solvent capacity for rubber, filtering the said solution to remove undissolved matter, mixing the said filtered solution with mineral oil, and exposing the mixture of rubber solution and mineral oil to a high vacuum at an elevated temperature to drive off the said solvent and to remove volatile impurities.

RUSSELL SWALE VINCENT.